Oct. 22, 1968  D. HAFFER  3,406,783

SOUNDPROOF PIPE CONNECTION

Filed June 13, 1966

INVENTOR
DIETER HAFFER

BY
Michael J. Striker
ATTORNEY

United States Patent Office 3,406,783
Patented Oct. 22, 1968

3,406,783
SOUNDPROOF PIPE CONNECTION
Dieter Haffer, Vallendar, Germany, assignor to Gesellschaft fur Technischen Fortschritt m.b.H., Grenzhausen, Germany
Filed June 13, 1966, Ser. No. 556,949
Claims priority, application Germany, June 18, 1965, G 43,896
20 Claims. (Cl. 181—33)

ABSTRACT OF THE DISCLOSURE

An end portion of a first pipe section is adjacent to but spaced from the end portion of a second pipe section. A body of elastic self-damping material is interposed between these ends portions and connected thereto. The body is provided with a bore communicating with the bores of the pipe sections. A cap is connected to one of the pipe sections and surrounds the body and, with clearance, the other pipe section.

---

The present invention relates to pipe connections in general, and more particularly to an improved soundproof pipe connection which may be utilized in sanitary installations to form a joint between two rigid or flexible conduits, in armatures, as a connector between a water line and a nozzle or faucet, and for like purposes.

It is already known to provide a pipe connection with a soundproofing insert of elastic material. A serious drawback of such conventional pipe connections is that they are either too bulky, too expensive, insufficiently resistant to bending, torsional or tensional stresses, and/or that their soundproofing effect is unsatisfactory.

Accordingly, it is an important object of the present invention to provide a very simple, compact and lightweight pipe connection which is rendered soundproof in a novel way and whose soundproofing effect is surprisingly satisfactory.

Another object of the invention is to provide a rugged soundproof connection which can withstand considerable torsional, tensional, tilting, compressive and other stresses.

A further object of the invention is to provide a pipe connection which can satisfactorily connect two conduits even in the event that its soundproofing component is destroyed or damaged.

An additional object of the invention is to provide a soundproof pipe connection which can be readily installed in practically all existing conduits, which utilize one or more components of conventional pipe connections, whose dimensions at most equal the dimensions of such conventional pipe connections and which can be used to establish a fluidtight connection between coaxial or offset conduits.

A concomitant object of the invention is to provide a novel soundproofing member which can be utilized in a pipe connection of the above outlined characteristics.

Still another object of the instant invention is to provide a soundproof pipe connection which can be installed or removed by resorting to very simple and readily available tools, wherein the application of such tools cannot result in damage to the soundproofing material, and which can be installed or detached by persons having little technical skill.

An additional object of the invention is to provide a soundproof pipe connection which can be produced in any desired size and which can be used to convey hot or cold fluids.

An ancillary object of my invention is to provide a pipe connection which can be used as a substitute for many conventional pipe connections and which can be installed in existing pipe lines as a substitute for such conventional pipe connections.

Briefly stated, one feature of my present invention resides in the provision of a pipe connection which comprises a pair of pipe sections having mutually spaced but adjacent end portions each of which preferably resembles a flange, a soundproofing or sound insulating member consisting of highly self-damping elastic material and comprising a main body portion disposed between and bonded to the end portions of the two pipe sections, a bore provided in the soundproofing member and communicating with the bores of the pipe sections so that a fluid can flow from one of the pipe sections, through the soundproofing member and into the other pipe section or vice versa, and a preferably cap-shaped coupling member connected to one of the pipe sections and surrounding with clearance the other pipe section. The coupling member and the pipe section which is connected therewith define between themselves a space or chamber which accommodates the main body portion of the soundproofing member. This soundproofing member is preferably provided with a diaphragm of varying wall thickness which bounds a portion of the bore in the main body portion and yields when the pressure of conveyed fluid increases. The soundproofing member further preferably comprises one or two tubular extensions each of which extends into and is bounded to one of the pipe sections. The bore of the soundproofing member is preferably bounded, from end to end, by a smooth internal surface and this bore preferably tapers in a direction from the bore of the one toward the bore of the other pipe section.

The novel features which are considered as characteristic for the invention are set forth in particular in the appended claims. The improved pipe connection itself, however, both as to its construction and the mode of assembling the same, together with additional features and advantages thereof, will be best understood upon perusal of the following detailed description of a specific embodiment with reference to the accompanying drawings, in which:

Figure 1:
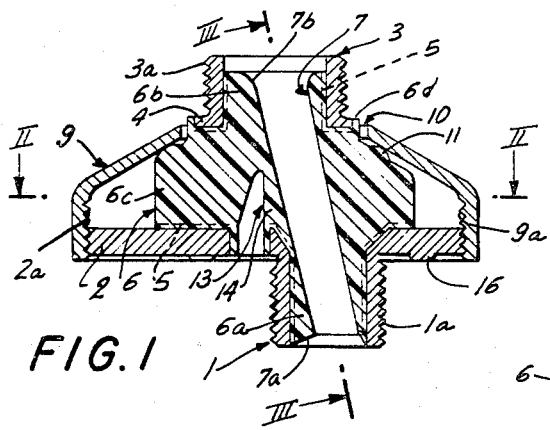
FIG. 1 is a longitudinal central section through a pipe connection which embodies my invention, the section being taken along the line I—I of FIG. 2 as seen in the direction of arrows.

Referring to the drawings in detail, and first to FIG. 1, there is shown a pipe connection which comprises four main components, namely, a first pipe section 1, a second pipe section 3, an elastic soundproofing member 6 (hereinafter called insulator for short), and a coupling member in the form of a cap 9. The pipe section 1 is formed with external threads 1a so that it may be screwed into a conduit (not shown) and comprises a relatively large eccentric end portion or flange 2 whose peripheral surface is provided with external threads 2a to mesh with internal threads 9a at the larger-diameter end of the cap 9. The pipe section 3 is axially spaced from and offset with reference to the pipe section 1 and is also formed with external threads 3a so that it can be attached to the end of a second conduit, to a nut, or to a nozzle (not shown). The end portion or flange 4 of the pipe section 3 is relatively small.

The insulator 6 provides a permanent connection between the pipe sections 1, 3 and is welded, glued or otherwise bonded to both pipe sections where indicated by broken lines 5. This insulator 6 comprises two tubular extensions 6a, 6b which respectively extend into the bores of the pipe sections 1, 3 and a relatively large median portion or trunk 6c which extends between the flanges 2 and 4. A relatively thin annular collar 6d of the insulator 6 surrounds the peripheral surface of the flange 4 and is separated from the internal surface at the smaller-diameter end of the cap 9 by a narrow annular gap 10. The bore 7 of the insulator diverges gradually in a direction from the bore of the pipe section 1 toward the bore of the pipe section 3, i.e., in the direction of fluid flow, and its ends are bounded by rounded surface portions 7a, 7b. The surface bounding the major part of the bore 7 between the surface portions 7a and 7b is smooth so that the insulator offers relatively little resistance to the flow of a fluid from the pipe section 1 to the pipe section 3. The conicity of the surface which surrounds the bore 7 contributes to the soundproofing effect of the insulator. It will be seen that the insulator 6 is bonded to the pipe section 1 along the internal surface of this pipe section and along a substantial part of the adjoining surface of the flange 2. Also, the insulator is bonded to the internal surface of the pipe section 3 and to the entire adjoining surface of the flange 4. The parts 1, 3 and 6 together form an integral unit but the cap 9 is detachable so that it can expose two parallel projections in the form of plate-like ribs 8 (see FIGS. 2 and 3) which extend from the exposed surface of the flange 2 and straddle two adjoining sides of the insulator 6.

Figure 2:
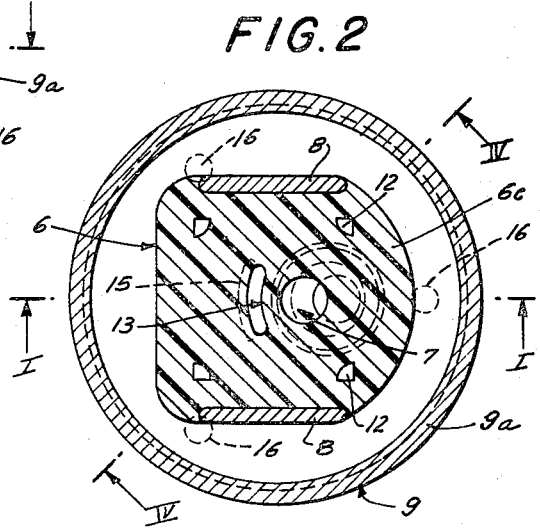
FIG. 2 is a section as seen in the direction of arrows from the line II—II of FIG. 1.

FIG. 2 shows that the dimensions of the trunk 6c exceed considerably the dimensions of the tubular extensions 6a, 6b, i.e., that the distance between the ribs 8 exceeds substantially the diameters of these extensions. The non-confined portions of the trunk 6c may be flat or they may be bounded by convex surfaces, both such possibilities being illustrated in FIG. 2. Though FIG. 1 shows that the tubular extensions 6a, 6b do not extend all the way to the open ends of the pipe sections 1 and 3, it is possible to make such extensions longer so that they will respectively terminate flush with the lower end of the pipe section 1 and with the upper end of the pipe section 3.

One function of the ribs 8 is to facilitate the application of a suitable tool, e.g., a wrench which may be utilized to change the angular position of the unit including the pipe sections 1, 3 and the insulator 6. It is to be noted that though the drawings show a threaded connection 2a, 9a which secures the cap 9 to the pipe section 1, such connection may be replaced by a conventional bayonet lock or the like without departing from the spirit of the present invention. The cap 9 and the pipe sections 1, 3 consist of metallic material, and the cap resembles a hollow cone whose axis coincides with the axis of the pipe section 3. The aforementioned annular gap 10 prevents the propagation of sound from the flange 2 to the pipe section 3 or vice versa. The smaller-diameter end of the cap 9 is located at a level below the upper side of the flange 4, as viewed in FIG. 1. This is of advantage because, if the threads 3a of the pipe section 3 are brought into mesh with a nut and the latter is driven home all the way into actual abutment with the flange 4, it is still held from direct contact with the cap 9 and cannot transmit sound.

A portion of the trunk 6c preferably follows or approximates the outline of the internal surface of the cap 9. Such portion of the trunk 6c may be provided with an annular stop or bead 11 which can undergo compression when the cap 9 is fully attached to the flange 2. The bead 11 may form a satisfactory seal between the insulator 6 and cap 9, and it can also serve to limit the extent to which the cap is screwed onto the flange 2.

Figure 4:
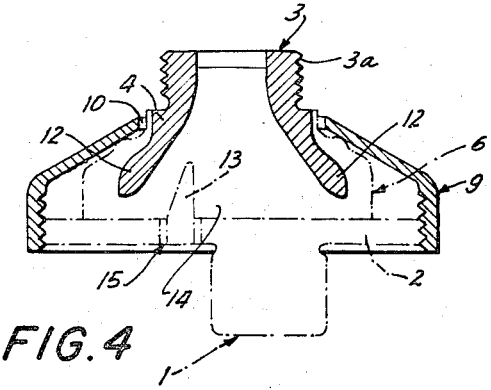
FIG. 4 is a section as seen in the direction of arrows from the line IV—IV of FIG. 2, one of the pipe sections and the elastic insulator being indicated by phantom lines.

The pipe section 3 is not only bonded to but is also anchored in the insulator 6. As shown in FIGS. 2 and 4, the flange 4 is provided with four outwardly extending projections or claws 12 which are equidistant from each other and whose tips are located on a circle whose diameter exceeds, at least slightly, the diameter of the opening at the smaller-diameter end of the cap 9. This insures that the cap 9 can hold the pipe sections 1 and 3 together even if the bonds 5 between the insulator 6 and the pipe sections happened to be destroyed. Two claws 12 are inwardly adjacent to each of the ribs 8 (see FIG. 2) but are separated therefrom by the material of the trunk 6c. Thus, if the pipe section 1 is tilted with reference to the pipe section 3, or vice versa, the one or the other pair of claws 12 will compress the adjoining elastic material in a direction toward the adjacent ribs 8, or vice versa. The same holds true when the two pipe sectoins tend to change their angular positions with reference to each other. The elastic material of the insulator 6 can readily take up compressive stresses which are transmitted thereto by the ribs 8 and claws 12. The length of the claws 12 should be sufficient to insure that a substantial part of the trunk 6c will undergo compression if one of the pipe sections 1, 3 is subjected to stresses which tend to change its inclination and/or angular position with reference to the other pipe section.

A portion 14 of the insulator 6 constitutes a diaphragm which is adjacent to the bore 7 and terminates at the exposed side of the flange 2. The wall thickness of this diaphragm 14 increases in a direction toward the pipe section 1, and the diaphragm is formed by providing the insulator 6 with a substantially kidney-shaped recess or depression 13 registering with a similar aperture 15 in the flange 2. The depth of the recess 13 preferably approximates half the thickness of the trunk 6c, i.e., half the shortest distance between the flanges 2 and 4. The width of this recess is preferably a fraction of its length, see FIG. 2, and the recess tapers in a direction toward the pipe section 3. That surface of the diaphragm 14 which is adjacent to the recess 13 may but need not be parallel with the axis of the pipe section 1. If the just mentioned surface is inclined, the taper of the diaphragm is even more pronounced than shown in FIG. 1.

The lower surface of the flange 2 (as viewed in FIG. 1) is preferably provided with one or more rounded protuberances 16 which can come into abutment with the exposed surface of a wall accommodating that conduit to which the pipe section 1 is connected by threads 1a. The protuberances 16 can compensate for eventual unevenness in the surface of such wall.

The pipe connection of my invention may be utilized in kitchens, bathrooms, laundries and similar areas where it is desirable to prevent the propagation of sound along pipe lines. It may form a joint between coaxial or offset pipe sections, in armatures, between flexible or rigid conduits, between a conduit and a nozzle, valve, faucet or tap, and is especially suited to interrupt the propagation of noises which arise in response to variations in the pressure of conveyed fluid. The insulator 6 consists of an elastic material having highly satisfactory self-damping characteristics. In addition to preventing the propagation of sound, the insulator 6 can resist considerable torsional, tensional, tilting, compressive and/or other stresses and provides a fluid-tight connection between the pipe sections without offering appreciable resistance to the flow of fluid therethrough. Combined with the cap 9, the insulator 6 resists axial movement of the pipe sections 1 and 3 away from each other. The cap 9 is out of direct contact with the pipe section 3 and need not be positively connected to the insulator. This cap is coaxial with the pipe section 3 and its smaller-diameter end surrounds with relatively small clearance (gap 10) the smaller flange 4. This contributes to compactness of the connection. It will be noted that the cap 9 is of very simple design, i.e., that it can properly surround the insulator 6 even though it resembles caps of the type used in conventional pipe connections. In addition to assisting the insulator 6 in taking up stresses which tend to move the pipe sections 1 and 3 away from each other, the cap 9 also protects the bonds 5, especially the bond between the insulator and the pipe section 1.

Since the tips of the claws 12 extend radially outwardly beyond the opening at the smaller-diameter end of the cap 9 and since the claws 12 are anchored in the trunk 6c of the insulator 6, a layer of elastic material is invariably located between the claws and the cap 9 when the pipe sections 1 and 3 tend to move away from each other whereby the material of the insulator undergoes compression which is a type of stress that is readily taken up by the elastic material. Furthermore, and as stated before, the cap 9 can connect the pipe sections 1 and 3 even if the bond 5 between the insulator 6 and the pipe section 1 is destroyed or weakened.

Figure 3:
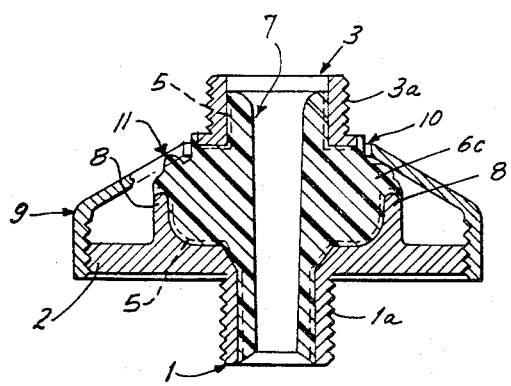
FIG. 3 is a section as seen in the direction of arrows from the line III—III of FIG. 1.

An important function of the ribs 8 on the flange 2 of the pipe section 1 is to facilitate rotation of the unit including the parts 1, 3 and 6 without subjecting the insulator to excessive torsional stresses such as could result in the destruction of bonds 5. Furthermore, and as pointed out hereinabove, the ribs 8 cooperate with the claws 12 to transmit rotary motion to the pipe section 3 through the intermediary of such layers of elastic material which are disposed therebetween. Thus, a single tool suffices to change the angular position of both pipe sections in a single operation. The positioning of the claws 12 with reference to the ribs 8 is preferably such that the ribs would rotate the pipe section 3 even if the insulator 6 were absent. FIG. 3 shows that the material of the insulator is bonded to the ribs 8. The same holds preferably true for the adjoining surfaces of the claws 12, and insulator 6. This insures that the area of bonded surfaces on the pipe sections 1, 3 on the one hand and on the insulator 6 on the other hand is very large so that the stresses per unit area are relatively small even if the connection is subjected to very high torsional, tilting or other stresses which tend to destroy the bonds 5. When subjected to pure compressive stresses, the insulator can withstand exceptionally large forces and undergoes very little deformation, to a considerable extent because it is confined in the space between the pipe sections 1, 3 and the cap 9.

The provision of the diaphragm 14 contributes significantly to the sound deadening effect of the insulator 6. This is especially true when the sound develops in response to changes in pressure of the column of conveyed fluid. The soundproofing effect of the diaphragm 14 is further improved if its wall thickness varies in a manner as shown in FIG. 1. The diaphragm yields in response to rising pressure of fluid in the bore 7 and its wall thickness is preferably such that it can yield in response to very rapidly rising pressure, when the pressure in the bore 7 varies at rapid intervals and also when the rise in pressure is relatively small.

Of course, the width of the recess 13, is viewed in the radial direction of the bore 7, should not be such that the major part of the trunk 6c would permit excessive deformation and eventual destruction of the diaphragm 14. Thus, when the diaphragm undergoes a predetermined maximum permissible deformation, it comes into abutment with the surface bounding the left-hand side of the recess 13, as viewed in FIG. 1, and is held against additional flexing. As stated before, the position and the width, depth and length of the recess 13 are selected in such a way that the thickness of the diaphragm varies in at least one direction. This can be achieved in a very simple way by resorting to a kidney-shaped recess and by making the axis of the recess to form an acute angle with the axis of the pipe section 1. An optimum relationship between the expected fluid pressures and the wall thickness of the diaphragm 14 can be obtained by resorting to a simple experimentation.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A pipe connection, comprising a pair of pipe sections having mutually spaced but adjacent end portions; a soundproofing member consisting of highly self-damping elastic material and comprising a main body portion extending from one to the other of said end portions and having opposite terminal portions each bonded to one of said end portions of said pipe sections, said soundproofing member having a bore bonded by an imperforate surface and communicating with the bores of said pipe sections; and a coupling member connected to one of said pipe sections and surrounding with clearance the other pipe section.

2. A pipe connection as set forth in claim 1, wherein said pipe sections are offset with reference to each other and wherein said coupling member is a cap defining with said one pipe section a space which accommodates the main body portion of said soundproofing member.

3. A pipe connection as set forth in claim 1, wherein said coupling member is a cap having an end provided with an opening which surrounds with annular clearance the end portion of said other pipe section.

4. A pipe connection as set forth in claim 1, wherein the end portion of said one pipe section is an annular flange and said coupling member is a cap having an open end detachably secured to said flange.

5. A pipe connection as set forth in claim 4, wherein the end portion of said other pipe section also constitutes a flange whose diameter is smaller than the diameter of said first mentioned flange, said cap having a second open end spacedly surrounding the flange of said other pipe section.

6. A pipe connection as set forth in claim 1, wherein the end portion of said other pipe section is a flange and said coupling member is a cap having an opening spacedly surrounding said flange, said flange having a plurality of projections extending into the main body portion of said soundproofing member and radially outwardly beyond said opening.

7. A pipe connection as set forth in claim 6, wherein said projections resemble claws and terminate short of the end portion of said one pipe section.

8. A pipe connection as set forth in claim 1, wherein the end portion of said one pipe section comprises a set of projections extending toward but short of the end portion of the other pipe section and partially bounding the main body portion of said soundproofing member within the confines of said coupling member.

9. A pipe connection as set forth in claim 8, wherein said projections form two parallel ribs disposed at the opposite sides of said main body portion.

10. A pipe connection as set forth in claim 9, wherein the end portion of said other pipe section also comprises a set of projections, one of said sets being disposed between and being separated from the projections of the other set by the material of said soundproofing member.

11. A pipe connection as set forth in claim 1, wherein said main body portion has a recess adjacent to and separated from the bore of said soundproofing member by a diaphragm which is dimensioned to yield in response to rising pressure of fluid flowing through said bores.

12. A pipe connection as set forth in claim 11, wherein said recess is kidney-shaped.

13. A pipe connection as set forth in claim 11, wherein the wall thickness of said diaphragm varies.

14. A pipe connection as set forth in claim 1, wherein said soundproofing member further comprises at least one tubular extension projecting into and bonded to one of said pipe sections.

15. A pipe connection as set forth in claim 1, wherein said pipe sections have parallel but offset axes and wherein the bore of said soundproofing member tapers in a direction from one of said pipe sections toward the other pipe section.

16. A pipe connection as set forth in claim 15, wherein said soundproofing member has a smooth internal surface bounding its bore from end to end.

17. A pipe connection as set forth in claim 1, wherein said coupling member is a cap whose dimensions radially of said pipe sections approximate the maximum radial dimensions of one of said pipe sections.

18. A pipe connection as set forth in claim 1, wherein each of said end portions is a flange and wherein said coupling member and said pipe sections consist of metallic material, said soundproofing member being bonded to the adjoining surfaces of said flanges and further comprising two tubular extensions each projecting into and being bonded to one of said pipe sections.

19. A pipe connection as set forth in claim 1, wherein said main body portion comprises an annular sealing portion which abuts against the internal surface of said coupling member, the end portion of said one pipe section and said coupling member being provided with intermeshing threads.

20. A pipe connection as set forth in claim 1, wherein said soundproofing member allows for some tilting, angular and axial movement between said pipe sections without permitting direct contact between said other pipe section and said one pipe section or said coupling member.

References Cited

UNITED STATES PATENTS

| | | | |
|---|---|---|---|
| 781,939 | 2/1905 | Fulton | 181—47 |
| 1,318,158 | 10/1919 | Larsh | 181—33 |
| 2,270,902 | 1/1942 | Rubissow | 181—33 |
| 3,038,553 | 6/1962 | Peters | 181—47 |
| 3,237,715 | 3/1966 | Peters | 181—47 |
| 2,126,706 | 8/1938 | Schmidt | 285—49 |

FOREIGN PATENTS

| | | |
|---|---|---|
| 119,704 | 3/1945 | Australia. |
| 323,094 | 8/1957 | Switzerland. |

ROBERT S. WARD, JR., *Primary Examiner.*